United States Patent
Wu

(10) Patent No.: US 7,444,527 B2
(45) Date of Patent: Oct. 28, 2008

(54) CIRCUIT FOR SAVING POWER OF A BATTERY WITHIN AN ELECTRONIC EQUIPMENT WHILE THE ELECTRONIC EQUIPMENT IS POWERED OFF

(75) Inventor: Kun-Lung Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 423 days.

(21) Appl. No.: 11/220,051

(22) Filed: Sep. 6, 2005

(65) Prior Publication Data

US 2006/0053322 A1 Mar. 9, 2006

(30) Foreign Application Priority Data

Sep. 6, 2004 (CN) .................. 2004 1 0051454

(51) Int. Cl.
*G06F 1/00* (2006.01)
*G06F 1/26* (2006.01)
*G06F 1/32* (2006.01)

(52) U.S. Cl. .................. 713/300; 713/320; 713/340

(58) Field of Classification Search .................. 713/300
See application file for complete search history.

(56) References Cited

U.S. PATENT DOCUMENTS

| 4,868,832 | A | * | 9/1989 | Marrington et al. ........... 714/22 |
| 6,647,501 | B1 | | 11/2003 | Ninomiya |
| 2004/0136129 | A1 | * | 7/2004 | Amada et al. .................. 361/82 |

* cited by examiner

*Primary Examiner*—Rehana Perveen
*Assistant Examiner*—Michael J Brown
(74) *Attorney, Agent, or Firm*—Morris Manning Martin LLP; Tim Tingkang Xia, Esq.

(57) ABSTRACT

A circuit for saving battery power within an electronic equipment while the electronic equipment is powered off, the circuit includes a switch circuit, a voltage regulator, a power management unit, and a system voltage terminal. The switch circuit is connected to the battery for controlling the supply of power from the battery to the electronic equipment. The voltage regulator is connected to the switch circuit and provides a regulated voltage. The power management unit coupled to the voltage regulator. A system voltage terminal is connected to a node between the voltage regulator and the power management unit via a first diode, the power management unit controls the system voltage. It is of advantage that a switch circuit is provided to control the supply of power from a battery to the power management unit, when the electronic equipment is switched off, no power is supplied to the power management unit.

5 Claims, 2 Drawing Sheets

CIRCUIT FOR SAVING POWER OF A BATTERY WITHIN AN ELECTRONIC EQUIPMENT WHILE THE ELECTRONIC EQUIPMENT IS POWERED OFF

BACKGROUND OF THE INVENTION

1. Field of the Invention

The present invention relates in general to a circuit of an electronic equipment, and particularly to a circuit which capable of saving power of a battery within the electronic equipment when the electronic equipment is switched off.

2. General Background

In recent years, as electronic equipments decrease in size and thickness, portable electronic equipment hand-carriable by users, such as, so called notebook personal computer, becomes important more and more in the market and has widely spread in today's business scenes. In those circumstances where AC power is not available, the electronic equipment typically including such notebook computers will be electrically driven by rechargeable batteries loaded therein. It will be desirable for most users that the electronic equipment runs longer before the battery runs down.

FIG. 3 illustrates a conventional power supply circuit used in notebooks. The power supply circuit includes a charger 10, a voltage regulator 12, and a power management unit 14. When an AC power source is connected to an AC adapter 11, electronic power is supplied from the AC adapter 11 to the charger 10. Then the electronic power is supplied to the voltage regulator 12, the voltage regulator 12 regulates the input voltage to 3.3V and 5V, then desired supply voltage of 3.3 or 5 V produced by the voltage regulator 12 are supplied to the internal circuit(s) of the notebook. Wherein, an output voltage of 3.3V is provided to the power management unit 14. The power management unit 14 controls the internal circuits of the notebook. When a battery 16 is used to provide the power to the notebook, the electrical power is supplied to the power management unit 14 through the charger 10 and the voltage regulator 12.

When the notebook is powered off, if the battery 16 is not drawn out from the notebook, the power management unit 14 may draw an amount of power. If the user did not use the notebook for a long time, the battery may run out of power. When the notebook run out of power during travel or out-door sport, and AC power is not available, the battery may not have enough residual energy to power the notebook, this may cause complications for the users.

What is needed is a circuit which capable of saving battery power within a notebook when the notebook is powered off.

SUMMARY

A circuit for saving battery power within an electronic equipment while the electronic equipment is powered off, the circuit includes a switch circuit, a voltage regulator, a power management unit, and a system voltage terminal. The switch circuit is connected to the battery for controlling the supply of power from the battery to the electronic equipment. The voltage regulator is connected to the switch circuit and provides a regulated voltage. The power management unit coupled to the voltage regulator. A system voltage terminal is connected to a node between the voltage regulator and the power management unit via a first diode, the power management unit controls the system voltage.

It is of advantage that a switch circuit is provided to control the supply of power from a battery to the power management unit, when the electronic equipment is switched off, no power is supplied to the power management unit.

Other objects, advantages and novel features will become more apparent from the following detailed description when taken in conjunction with the accompanying drawings, in which:

DETAILED DESCRIPTION OF THE INVENTION

Figure 1:
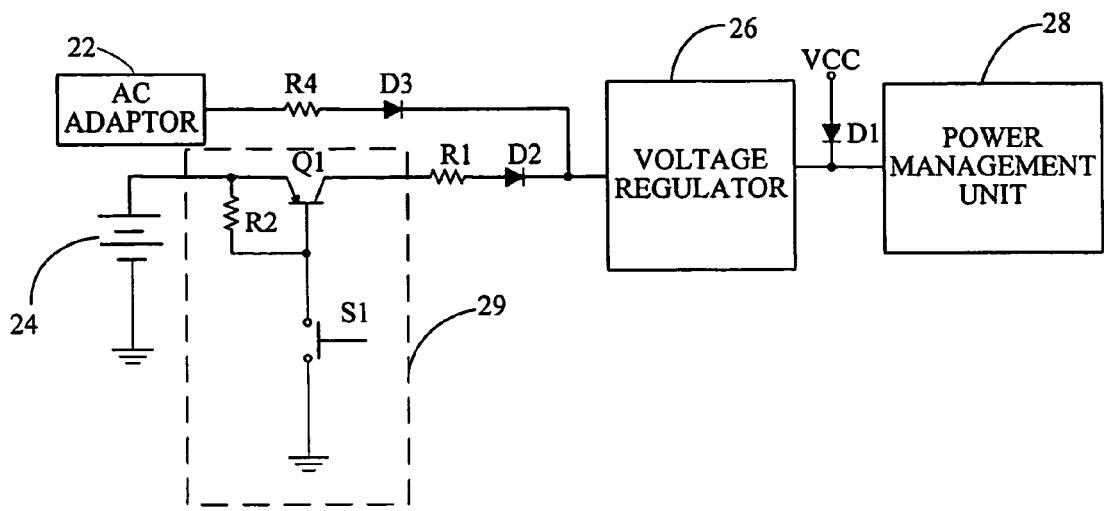
FIG. 1 is a circuit block diagram of a preferred embodiment of the present invention.

Referring to FIG. 1, a power circuit of a portable electronic equipment of a first preferred embodiment of the present invention includes a voltage regulator 26, a power management unit 28, a switch circuit 29. The voltage regulator 26 and the power management unit 28 are loaded to drain power from a battery or an AC power.

The power circuit includes two input branch circuits, one is an AC power input branch circuit, another is a battery input branch circuit. In the AC power input branch circuit, a power supply line from an AC adaptor 22 is connected via a resistor R4 to an anode of a diode D3, a cathode of the diode D3 is connected to the voltage regulator 26. In the battery input branch circuit, a battery 24 is connected to an emitter of a transistor Q1, a collector of the transistor Q1 is connected via a resistance R1 to a cathode of a diode D2, a base of the transistor Q1 is connected via the power button S1 to the ground. A cathode of the diode D2 is also connected to the voltage regulator 26. A resistor R2 is connected between the base and the emitter of the transistor Q1. The voltage regulator 26 acts to regulate voltages from the battery 24 and the AC adaptor 22 to produce system voltages of 5V and 3.3V. An output system voltage of 3.3V is provided to the power management unit 28. A system voltage VCC is connected via the diode D1 to a node between the voltage regulator 26 and the power management unit 28.

When the notebook is driven by the battery 24, press the power button S1 to turn the notebook on, the transistor Q1 is turned on so that the voltage power of the battery 24 is supplied through the resistor R1 and the diode D2 to the voltage regulator 26, the voltage regulator 26 outputs 3.3V DC voltage to the power management unit 28 to enable the power management unit 28 to start the system voltage VCC, which acquires power from the battery 24 via another circuit. One branch of the system voltage VCC of 3.3V is also supplied to the power management unit 28 to ensure the system operated normally. The power button S1 is a trigger switch. That is, when the power button S1 is released, the transistor Q1 is turned off. The battery does not directly supply the voltage to the power management unit 28 anymore, and the power of the power management unit 28 is supplied by the system voltage VCC. When the user wants to shut down the notebook, the power button S1 is pressed, the transistor Q1 is turned on, the battery provides voltage to the power management unit 28 via the resistance R1, the diode D2, and the voltage regulator 26. The power management 28 disables all system powers to shut down the notebook. Then the power button S1 is released, the transistor Q1 is turned off, the switch circuit 29 is an open circuit, the battery input branch circuit is cut-off, so the battery no longer provides voltage to the power management unit 28.

Therefore, when the notebook is switched off, the switch circuit 29 is cut-off, the power management unit 28 does not consume voltage of the battery, thereby increasing the standby time of the battery.

When the AC power is provided to the notebook, the AC power is supplied from the AC adaptor 22 to the power management 28 via the resistor R4, the diode D3, and the voltage regulator 26.

When the battery is in the notebook and the AC power is used to supply power to the notebook, the power of the notebook is provided by the AC power due to the voltage of the AC power higher than the battery and the unilateral conduction characteristic of the diode D2 and D3.

Figure 2:
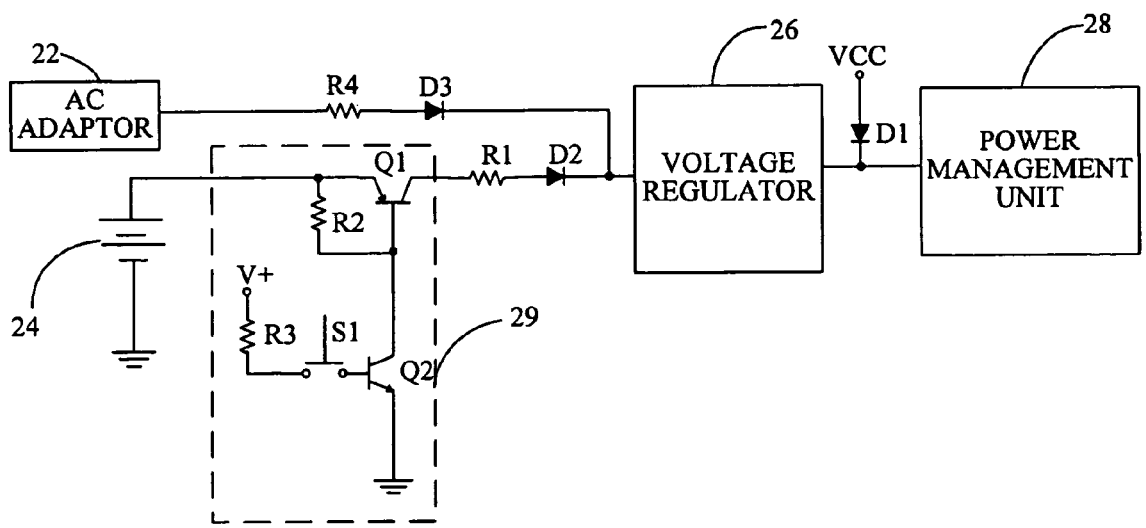
FIG. 2 is a circuit block diagram of a second preferred embodiment of the present invention.
Figure 3:
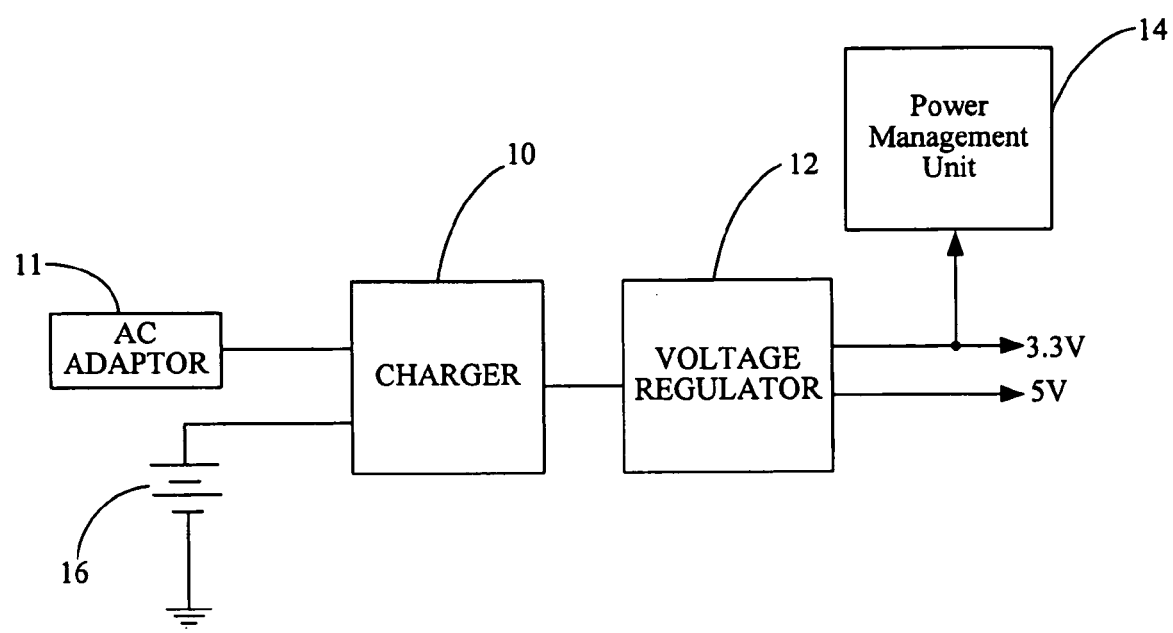
FIG. 3 is a conventional power supply circuit used in notebooks.

FIG. 2 is a circuit block diagram of a second embodiment of the present invention. The difference between the two embodiments is the switching circuit 29. The switch circuit 29 of the second embodiment of the present invention includes a power button S1, a pnp bipolar transistor Q1, a npn bipolar transistors Q2, and two resistors R2, R3. The power button S1 is connected via the resistor R3 to a high voltage terminal V+, a base of the transistor Q2 is connected to the power button S1, and an emitter of the transistor Q2 is grounded. An collector of the transistor Q2 is connected to a base of the transistor Q1. The emitter of the transistor Q1 is connected to the battery 24, a collector of the transistor Q1 is connected to the resistor R1. The resistor R2 is coupled between the emitter and the base of the transistor Q1.

When the notebook is driven by the battery 24, press the power button S1 to turn the notebook on, the transistor Q2 is turned on, the base current of the transistor Q1 flows through the transistor Q2, the transistor Q1 is turned on so the voltage of the battery 24 is supplied through the resistor R1 and the diode D2 to the voltage regulator 26, the voltage regulator 26 outputs 3.3V DC voltage to the power management unit 28 to enable the power management unit 28 to start the system voltage. A 3.3V system voltage VCC then is supplied to the power management unit 28 to ensure the system operated normally. When the power button S1 is released, the transistors Q1 and Q2 are turned off, the battery does not supply the voltage to the power management unit 28, and the power of the power management unit 28 is supplied by the system voltage VCC. When the user wants to shut down the notebook, the power button S1 is pressed, the transistors Q1 and Q2 are turned on, the battery provides the voltage to the power management 28 via the resistor R1, the diode D2, and the voltage regulator 26. The power management unit 28 disable all system powers to shut down the notebook. Then the power button S1 is released, the transistors Q1 and Q2 are turned off, the switch circuit 29 is an open circuit, the battery input branch circuit is cut-off, so the battery no longer provides voltage to the power management unit 28. In this state, the power management unit 28 does not consume the power of the battery 24.

Preferably, the transistor Q1 is a bipolar transistor, and more preferably a pnp bipolar transistor. In the second embodiment the switch circuit includes a second transistor Q2. The second transistor Q2 is a typically npn bipolar transistor. However, alternatively, the first transistor and the second transistor may be P and N channel enhancement type MOSFETs, respectively.

According to the embodiments of the present invention described above, a switch circuit is provided in the battery input branch circuit. When the notebook is switched off, the switch circuit is cut-off, and the power management unit does not drain power of the battery 24 so as to prolong the standby time of the battery.

In general, the present invention can apply to any battery operated electric equipments such as mobile phones and personal digital assistances (PDAs).

It is to be understood, however, that even though numerous characteristics and advantages of the present embodiments have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for saving power of a battery within an electronic equipment while the electronic equipment is powered off, the circuit comprising:
    a switch circuit connected to a battery for controlling supply of power from the battery to the electronic equipment;
    a voltage regulator connected to the switch circuit, the voltage regulator providing regulated voltages;
    a power management unit coupled to the voltage regulator;
    a system voltage terminal connected to a node between the voltage regulator and the power management unit via a first diode, the power management unit controlling system voltage; and
    a first resistor, a second diode and the switch circuit being connected in series;
    wherein the switch circuit comprises a first transistor, a second resistor, and a power button, the battery is coupled to a first polar of the first transistor, a second polar of the first transistor is coupled to the first resistor, a third polar of the first transistor is connected to the ground via the power button, the second resistor is connected between the third polar of the first transistor and the first polar of the first transistor.

2. The circuit as claimed in claim 1, wherein an external power source is connected to the voltage regulator via a fourth resistor and a third diode.

3. A circuit for saving power of a battery within an electronic equipment while the electronic equipment is powered off, the circuit comprising:
    a battery;
    a switch circuit connected to the battery;
    a voltage regulator connected to the switch circuit, the switch circuit controlling power supply from the battery to the voltage regulator, the voltage regulator receiving the power from the battery and providing regulated voltages;
    a power management unit coupled to the voltage regulator receiving the regulated voltages;
    a system voltage terminal connected to a node between the voltage regulator and the power management unit via a first diode;
    a first resistor; and
    a second diode,
    wherein the switch circuit, the first resistor, and the second diode are connected in series between the battery and the voltage regulator; the switch circuit comprises a first transistor, a second resistor, and a power button, the battery is coupled to a first polar of the first transistor, a second polar of the first transistor is coupled to the first resistor, a third polar of the first transistor is connected to the ground via the power button, the second resistor is connected between the third polar of the first transistor and the first polar of the first transistor.

4. The circuit for saving power of a battery within an electronic equipment as claimed in claim 3, wherein the first transistor is a pnp bipolar transistor.

5. The circuit for saving power of a battery within an electronic equipment as claimed in claim 3, wherein an external power source is connected to the voltage regulator via a third resistor and a third diode.

* * * * *